Aug. 17, 1965  S. BEESLEY ETAL  3,201,460
MANUFACTURE OF PERACETIC ACID
Filed Aug. 13, 1962
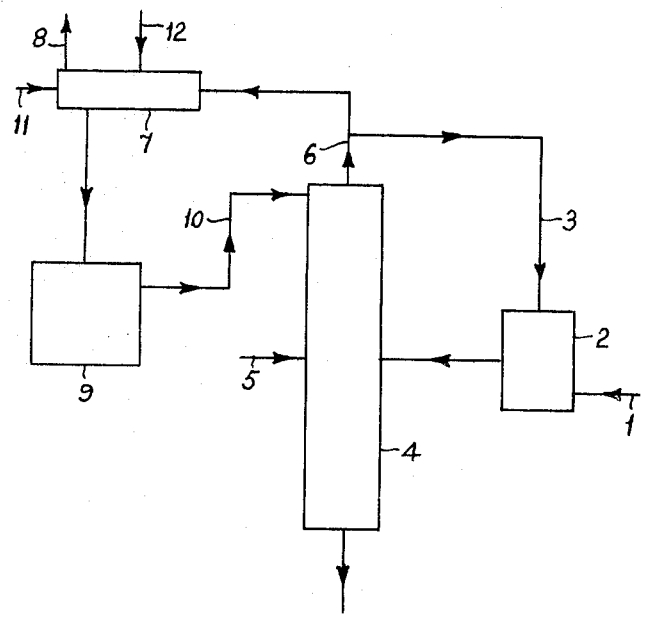
DONALD ARTHUR SHARMAN
STANLEY BEESLEY
Inventors
By their Attorneys
Howson and Howson

United States Patent Office 3,201,460
Patented Aug. 17, 1965

3,201,460
MANUFACTURE OF PERACETIC ACID
Stanley Beesley, Derby, and Donald Arthur Sharman, Coventry, England, assignors to British Celanese Limited, London, England, a British company
Filed Aug. 13, 1962, Ser. No. 216,473
Claims priority, application Great Britain, Sept. 7, 1961, 32,106/61
6 Claims. (Cl. 260—502)

This invention relates to the production of peracetic acid.

It is known, see for example, the Bludworth United States specification No. 2,314,385, that peracetic acid can be produced by reacting acetaldehyde with oxygen in the vapour phase, for example at temperatures of the order of 120 to 180° C., provided that the acetaldehyde is in considerable excess over the oxygen so that the risks of explosion are minimised. In general, the acetaldehyde and the oxygen have been used in a ratio of at least 8 mols of acetaldehyde to 1 mol of oxygen.

The reaction has hitherto been carried out by feeding the acetaldehyde and the oxygen to a reactor usually made of aluminium and passing the gaseous reaction products to a fractionating column to which a suitable solvent such as acetone, methylal or methyl acetate is fed to dissolve the peracetic acid in conjunction with acetic acid, which is also formed to some extent in the reactor, and the unreacted acetaldehyde taken from the column head, after separation of waste gas, is recycled to the reactor. When this process is carried out commercially, in which normally at least 90 percent by weight of the oxygen fed to the reactor is reacted, the molar ratio of peracetic acid to acetic acid recovered in the solvent is usually of the order of 2 to 2.5:1. Higher ratios of peracetic acid to acetic acid can be obtained by allowing a large proportion, for example from 30 to 50 percent, to remain unreacted but such processes tend to be uneconomic due to the difficulty in recovering the unreacted oxygen and also the presence of oxygen in the recovered acetaldehyde stream increases the explosive risk as such mixtures tend to be explosive.

In order to separate the unreacted acetaldehyde from the gas stream leaving the column head, it has hitherto been necessary to employ a condenser system which cools the gas stream to a temperature not exceeding 21° C. and it has been necessary to use refrigeration plant in order to obtain such cooling.

We have now found that the oxidation of acetaldehyde to peracetic acid can be carried out satisfactorily in the presence of relatively large proportions of the solvent used to extract the peracetic acid. This observation indicates that it is not necessary to carry out a rigorous separation of the acetaldehyde leaving the column head and accordingly, in the present invention, the acetaldehyde feed mixture recycled to the reactor contains at least 15 percent, for example from 25 to 50 percent of its weight of the solvent. Thus, in accordance with this invention, the acetaldehyde returned to the reactor contains, per 100 parts of acetaldehyde, at least 17.5 parts and preferably from 33.3 to 100 parts of the solvent.

An important advantage of the present invention is that the margin of safety in the process is increased, with the result that lower acetaldehyde to oxygen ratios can be used. With this invention the ratio may be as low as 5.5:1. The present invention also facilitates operation of the process and also permits a marked economy in the refrigeration costs of operating the process.

In carrying out this invention the temperature of the gas stream leaving the column head is preferably at least 25° C., for example in the range of 35–45° C.

The solvent used to recover the peracetic acid is preferably one which boils at not more than 80° C. Acetone is the preferred solvent but other solvents such as methylal, methyl acetate, ethyl acetate and methylene chloride may also be used.

The procedure according to the invention is illustrated by the following examples in both of which reference is made to the accompanying drawing which is a flow-sheet of the process which is continuous.

Example 1

Oxygen at a rate of 55 lb./hour is fed by way of a feed-pipe 1 to a reactor 2, which is at about 150° C., and at the same time recycled gases are fed to the reactor 2 by pipe 3 to provide 360 lb./hour of acetone (the solvent used) and 540 lb./hour of acetaldehyde mixed with about 10 lb./hour of other gases. The acetaldehyde:oxygen molar ratio is 7.1:1. From the reactor the reaction mixture is passed to the middle of a fractionating colum 4 to which acetone is fed at a rate of 320 lb./hour through a pipe 5. The temperature of the column at its base is 70° C. and the top temperature is 37° C. The product removed from the base of the column 4 contains 90 lb./hour of peracetic acid, 25 lb./hour of acetic acid and 315 lb./hour of acetone. The gases leave the top of the column by way of a pipe 6 from which the recycled mixture is withdrawn by pipe 3 and the remainder of the gas at 37° C. together with 50 lb./hour of nitrogen through pipe 12 is passed to a condenser 7 from which vent gases are removed by a pipe 8 and then, by way of a reservoir 9 (temperature 20° C.) and pipe 10, back to the top of the column 4, this feed being 1440 lb./hour of acetone and 2160 lb./hour of acetaldehyde.

The make-up of the acetaldehyde, amounting to 96 lb./hour, is effected at predetermined intervals by feeding in acetaldehyde gas to the system through pipe 11 feeding into the condenser 7.

Example 2

Oxygen at a rate of 80 lb./hour is fed into the reactor 2 which is at a temperature of 150° C., together with a recycle mixture containing 270 lb./hour of acetone and 630 lb./hour of acetaldehyde together with about 10 lb./hour of other gases. Under these conditions the acetaldehyde:oxygen molar ratio is 5.5:1.

From the reactor the reaction mixture is passed to the fractionating column to which acetone at a rate of 425 lb./hour is fed. The temperature of the column at the base is 70° C. and at the head is 34° C. The product removed from the column base contains 120 lb./hour of peracetic acid, 45 lb./hour of acetic acid and 425 lb./hour of acetone. Part of the gases from the column top are recycled to the reactor and the remainder together with about 50 lb./hour nitrogen is passed through condenser 7 from which vent gases are removed and then by way of reservoir 9 back to the top of column 4. This feed is 1080 lb./hour acetone and 2520 lb./hour acetaldehyde.

Make-up acetaldehyde amounting to about 132 lb./hour is fed as vapour continuously to condenser 7 in order to maintain a steady level in reservoir 9.

In the above examples a single reactor 2 has been used. The present invention may, however, be applied also to processes using two or more reactors in accordance with the John and Braddock application U.S. Serial No. 162,343, now abandoned.

Acetone used in the above examples may be replaced by methylal.

What we claim is:

1. A process for the production of peracetic acid by reacting acetaldehyde with oxygen in the vapour phase wherein the reaction is carried out in the presence of at least 17.5 percent by weight, based on the weight of the acetaldehyde, of a solvent for peracetic acid which has a boiling point not exceeding 80° C.

2. A process as claimed in claim 1 wherein the process is carried out in the presence of 33.3 to 100 percent by weight, based on the weight of the acetaldehyde, of the solvent.

3. A process as claimed in claim 1 wherein the solvent used is acetone.

4. A continuous process for the production of peracetic acid by reacting an excess of acetaldehyde and oxygen in the vapour phase within a reactor, passing the gaseous reaction product from the reactor to a fractionating column, feeding to the column a solvent for peracetic acid which solvent has a boiling point not exceeding 80° C. and recovering the resultant peracetic acid solution from the base of the column, wherein unreacted acetaldehyde vapour recovered from the top of the column is recycled to the reactor in admixture with at least 17.5 percent of its own weight of the said solvent and the amount of acetaldehyde removed from the system by the reaction with oxygen is made up by feeding acetaldehyde gas into the recycled gas stream.

5. A process as claimed in claim 4 wherein the recycled acetaldehyde contains from 33.3 to 100 percent of its weight of the solvent.

6. A process as claimed in claim 4 wherein the solvent used is acetone.

References Cited by the Examiner

FOREIGN PATENTS 1,210,060    9/59    France.

OTHER REFERENCES

John et al.: Chemistry and Industry, Jan. 13, 1962, pages 64–66, TP1563.

LORRAINE A. WEINBERGER, *Primary Examiner.*

LEON ZITVER, *Examiner.*